United States Patent
Garcia et al.

(10) Patent No.: US 10,801,321 B2
(45) Date of Patent: Oct. 13, 2020

(54) METHOD FOR MONITORING SALINITY WITHIN AN UNDERGROUND FORMATION

(71) Applicant: IFP Energies nouvelles, Rueil-Malmaison (FR)

(72) Inventors: Bruno Garcia, Neuilly sur Seine (FR); Aurelien Cherubini, Aubiac (FR); Herve Deschamps, Noisy le Roi (FR); Adrian Cerepi, Pessac (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/470,647

(22) PCT Filed: Nov. 30, 2017

(86) PCT No.: PCT/EP2017/080970
§ 371 (c)(1),
(2) Date: Jun. 18, 2019

(87) PCT Pub. No.: WO2018/114268
PCT Pub. Date: Jun. 28, 2018

(65) Prior Publication Data
US 2019/0323344 A1    Oct. 24, 2019

(30) Foreign Application Priority Data
Dec. 20, 2016 (FR) .................... 16 62889

(51) Int. Cl.
*E21B 49/08* (2006.01)
*E21B 47/06* (2012.01)
(Continued)

(52) U.S. Cl.
CPC .............. *E21B 49/08* (2013.01); *E21B 47/06* (2013.01); *E21B 47/10* (2013.01); *E21B 49/00* (2013.01);
(Continued)

(58) Field of Classification Search
CPC .......... E21B 47/06; E21B 47/10; E21B 49/00; E21B 49/02; E21B 49/08; G01V 3/38; G01V 3/265
See application file for complete search history.

(56) References Cited

U.S. PATENT DOCUMENTS 5,841,280 A *   11/1998   Yu ........................... G01V 3/265
                                                            324/323
7,150,188 B2 *  12/2006   Charara ................... G01V 3/24
                                                            73/152.05
(Continued)

FOREIGN PATENT DOCUMENTS

WO   2012/158145 A1   11/2012
WO   2016/046455 A1   3/2016

OTHER PUBLICATIONS

International Search Report for PCT/EP2017/080970, dated Mar. 22, 2018, and English translation submitted herewith (5 pages).
(Continued)

*Primary Examiner* — John Fitzgerald
(74) *Attorney, Agent, or Firm* — Fitch, Even, Tabin & Flannery, L.L.P.

(57) ABSTRACT

Method of exploiting and/or of monitoring the exploitation of a fluid such as a hydrocarbon fluid present in at least one geologic layer of an underground formation.
From consecutive pressure and spontaneous potential measurements taken at least at one measurement point in at least one well drilled through at least the geologic layer of interest, the slope of a curve showing the evolution of the spontaneous potential gradient as a function of the pressure gradient is determined. Then, from this slope and from a graph representative of the evolution of the electrokinetic
(Continued)

coupling coefficient as a function of the salinity for the layer considered, a salinity value is determined at the measurement point.

7 Claims, 2 Drawing Sheets

(51) Int. Cl.
| | | |
|---|---|---|
| *E21B 47/10* | (2012.01) | |
| *E21B 49/00* | (2006.01) | |
| *E21B 49/02* | (2006.01) | |
| *G01V 3/26* | (2006.01) | |
| *G01V 3/38* | (2006.01) | |
| *E21B 43/16* | (2006.01) | |

(52) U.S. Cl.
CPC .............. *E21B 49/02* (2013.01); *G01V 3/265* (2013.01); *G01V 3/38* (2013.01); *E21B 43/16* (2013.01); *E21B 49/0875* (2020.05)

(56) References Cited

U.S. PATENT DOCUMENTS

| | | | | |
|---|---|---|---|---|
| 7,819,181 B2* | 10/2010 | Entov | ...................... | E21B 43/26 |
| | | | | 166/66 |
| 8,682,587 B2* | 3/2014 | Singer | .................. | G01V 11/007 |
| | | | | 702/11 |
| 10,101,495 B2* | 10/2018 | Li | ......................... | G01V 11/007 |
| 2006/0130573 A1* | 6/2006 | Charara | .................... | G01V 3/24 |
| | | | | 73/152.51 |
| 2007/0150200 A1* | 6/2007 | Charara | .................. | G01V 3/265 |
| | | | | 702/6 |
| 2007/0256830 A1* | 11/2007 | Entov | ...................... | G01V 3/26 |
| | | | | 166/250.1 |
| 2008/0306692 A1* | 12/2008 | Singer | .................. | G01V 11/007 |
| | | | | 702/11 |
| 2013/0197810 A1 | 8/2013 | Haas et al. | | |
| 2016/0178785 A1 | 6/2016 | Wilson et al. | | |
| 2017/0261642 A1* | 9/2017 | Li | ......................... | G01V 11/007 |
| 2019/0086350 A1* | 3/2019 | Cerepi | .................. | G01N 27/026 |

OTHER PUBLICATIONS

Esmaeili, S., Rahbar, M., Pahlavanzadeh, H. and Ayatollahi, S. (2016), Investigation of streaming potential coupling coefficients and zeta potential at low and high salinity conditions: Experimental and modeling approaches, Journal of Petroleum Science and Engineering, vol. 145, Sep. 2016, pp. 137-147, ISSN 0920-4105.
Glover, P. W. J., E. Walker, and M. D. Jackson (2012), Streaming-potential coefficient of reservoir rock: A theoretical model, Geophysics, 77(2), D17-D43, doi:10.1190/geo2011-0364.1.
Jaafar, M. Z., J. Vinogradov, and M. D. Jackson (2009), Measurement of streaming potential coupling coefficient in sandstones saturated with high salinity NaCl brine, Geophys. Res. Lett., 36, L21306, doi:10.1029/2009GL040549.
Vinogradov, J., M. Z. Jaafar, and M. D. Jackson (2010), Measurement of streaming potential coupling coefficient in sandstones saturated with natural and artificial brines at high salinity, J. Geophys. Res., 115, B12204, doi:10.1029/2010JB007593.
Written Opinion of International Searching Authority for PCT/EP2017/080970.
Chapellier, D., 2009, Diagraphies Pétrole, Cours online de Géophysique, Université de Lausanne, Institut Français du Pétrole, http://www-ig.unil.ch/cours/pdf/doc_dia/diapet_f.pdf (see, e.g., specification of U.S. Appl. No. 16/470,647 (as filed) at p. 5, I. 22, to p. 6, I. 5).
English language machine translation of Chapter 2 (p. 14-23) of Chapellier, D., 2009, Diagraphies Pétrole, Cours online de Géophysique, Université de Lausanne, Institut Français du Pétrole, http://www-ig.unil.ch/cours/pdf/doc_dia/diapet_f.pdf.

\* cited by examiner

METHOD FOR MONITORING SALINITY WITHIN AN UNDERGROUND FORMATION

CROSS-REFERENCE TO RELATED APPLICATIONS

This application is a U.S. national phase application filed under 35 U.S.C. § 371 of International Application No. PCT/EP2017/080970, filed Nov. 30, 2017, designating the United States, which claims priority from French Patent Application No.: 16/62.889, filed Dec. 20, 2016, the entire content of each of which are hereby incorporated herein by reference.

FIELD OF THE INVENTION

The present invention relates to the exploitation and/or monitoring of the exploitation of a fluid contained in an underground formation. More particularly, the present invention can relate to the management of an enhanced recovery process for producing hydrocarbons contained in a geologic reservoir by injection of a sweep fluid.

Development of a hydrocarbon reservoir by primary recovery consists in extracting, via a so-called production well, the hydrocarbons present in the reservoir through the overpressure naturally prevailing within the reservoir. This primary recovery only enables access to a small amount of the hydrocarbons contained in the reservoir (of the order of 10% to 15%).

To be able to continue extracting hydrocarbons from a reservoir, notably when the reservoir pressure becomes insufficient to displace the hydrocarbons still in place, i.e. insufficient to exceed the capillary pressure of the reservoir rock, production methods referred to as secondary are implemented. Notably, a fluid is injected (reinjection of produced water, diluted or not, seawater or river water injection, or gas injection for example) into the hydrocarbon reservoir so as to exert, within this reservoir, overpressure and sweeping likely to cause the hydrocarbons to flow into the production well(s). A usual technique in this context is water injection (also referred to as waterflooding), where large volumes of water are injected under pressure into the reservoir via injection wells. The injected water drives part of the hydrocarbons encountered and pushes them towards one or more production wells. Secondary production methods such as waterflooding however allow only a relatively small part of the hydrocarbons in place to be extracted (typically of the order of 30%). This partial sweep is notably due to oil entrapment by capillary forces, to viscosity and density differences between the injected fluid and the hydrocarbons in place, and to heterogeneities at microscopic or macroscopic scales (pore scale and reservoir scale).

There are various techniques known as enhanced oil recovery (EOR) techniques intended to enable best recovery of the rest of the hydrocarbons that remain in underground formations after implementing primary and secondary production methods. Examples thereof are techniques similar to those using the aforementioned water injection, but using a water comprising additives such as, for example, water-soluble surfactants (referred to as surfactant flooding), or polymers. Using such surfactants notably induces a decrease in the water/oil interfacial tension, which provides more efficient entrainment of the oil trapped at pore constrictions. Using polymers causes an increase in the water viscosity, thus enabling higher affinity with the oil in place and, therefore, higher sweep efficiency.

Another known technique is enhanced recovery by injection of gases, miscible or not (natural gas, nitrogen or $CO_2$). This technique allows to maintain the pressure in the oil reservoir during development, and it can also allow, in the case of miscible gases, to mobilize the hydrocarbons in place and thus to improve the flow rate thereof. A commonly used gas is carbon dioxide when it is available at low cost.

There are also alternative techniques based on the injection of foam into the oil reservoir. Due to its high apparent viscosity, foam is considered as an alternative to gas as the injection fluid employed in hydrocarbon reservoirs. The mobility of foam is thus reduced in relation to gas which tends to segregate and to rapidly break through to the production wells, notably in heterogeneous and/or thick reservoirs. Enhanced recovery using foam injection is particularly attractive because it requires injection of smaller volumes than other enhanced recovery methods using non-foaming fluids. It should be noted that there are also methods consisting in an alternate injection of foam and gas such as $CO_2$, enabling better mobility control of the hydrocarbon products present in the reservoir, the aim being to obtain good conformance (homogeneous piston effect) of the method.

Another known technique is the thermal enhanced recovery method, where a hot fluid such as a heat carrier fluid or a gas in vapour form (for example steam in the Steam-Assisted Gravity Drainage SAGD method) is injected into an oil reservoir. Due to calories supply and temperature increase, thermal methods allow to reduce the viscosity of hydrocarbons, notably heavy crudes, and thus to make them somewhat more producible.

In all cases, after injection of chemical products in a broad sense, of gaseous fluids or after implementing a thermal method, the salinity within the reservoir evolves. For example, the injection of a miscible fluid, whatever it is, causes dilution of the salts in presence in the reservoir. However, the salinity may also be modified by the injection of a saline fluid such as brine or seawater during an EOR process or a well test. In any case, the salinity of a hydrocarbon reservoir evolves during the extraction proper of these hydrocarbons, through the production of brine containing gas and oil.

Now, salinity plays an important role in the affinity of the porous medium with the oil in place in this medium, and vice versa. Therefore, it is important to be able to monitor the evolution of this salinity within a hydrocarbon reservoir under development, notably in order to anticipate "fluid-rock" interaction mechanisms that occur in an oil reservoir during development, and therefore to provide better EOR process management. Furthermore, in case of leakage in a neighbouring compartment (such as a secondary reservoir, an aquifer), salinity is a parameter to be monitored so as to highlight this leakage and its evolution over time.

BACKGROUND OF THE INVENTION

The following documents are mentioned in the description hereafter:

Chapellier, D., 2009, Diagraphies Pétrole, Cours online de Géophysique, Université de Lausanne, Institut Français du Pétrole, http://www-ig.unil.ch/cours/pdf/doc_dio/diopet_f-.pdf.

Esmaeili, S., Rahbar, M., Pahlavanzadeh, H. and Ayatollahi, S. (2016), Investigation of streaming potential coupling coefficients and zeta potential at low and high salinity conditions: Experimental and modeling approaches, Journal of Petroleum Science and Engineering, Volume 145, September 2016, Pages 137-147, ISSN 0920-4105.

Glover, P. W. J., E. Walker, and M. D. Jackson (2012), Streaming-potential coefficient of reservoir rock: A theoretical model, Geophysics, 77(2), D17-D43, doi:10.1190/geo2011-0364.1.

Jaafar, M. Z., J. Vinogradov, and M. D. Jackson (2009), Measurement of streaming potential coupling coefficient in sandstones saturated with high salinity NaCl brine, Geophys. Res. Lett., 36, L21306, doi:10.1029/2009GL040549.

Vinogradov, J., M. Z. Jaafar, and M. D. Jackson (2010), Measurement of streaming potential coupling coefficient in sandstones saturated with natural and artificial brines at high salinity, J. Geophys. Res., 115, B12204, doi:10.1029/2010JB007593.

Conventionally, estimating salinity in an underground formation is done either 1) in the laboratory, after taking a sample of the fluid present in the formation and using a conductimeter, or 2) in-situ, from an electrical resistivity measurement taken by means of a logging tool lowered in a well drilled through the formation of interest.

In case of salinity estimation in the laboratory, a sample of the fluid present in the formation of interest needs to be taken. Hydrocarbon reservoirs being located at depths of the order of one kilometer, sometimes under a thick water layer, this operation is never easy to carry out technically, notably because the sample needs to be properly preserved from the surrounding fluids (for example, the fluid sample must be preserved from the fluids present in the well). A conductivity measurement is then performed on the fluid sample. From a standard graph representing the evolution of conductivity as a function of salinity, the salinity of the fluid of interest can be deduced. However, given the complexity of taking such a sample, this type of approach does not enable real-time monitoring of a hydrocarbon exploitation site (notably monitoring fluid leaking into neighbouring compartments), and in particular real-time management thereof.

In-situ salinity estimation using electric log type measurements requires operations of lowering logging tools into a wellbore and retrieving them therefrom, measuring by means of these tools, then estimating the salinity using graphs set up by taking account of the resistivity-temperature-salinity relation. Among the parameters measured by the electric logging tools, the electrical resistivity of rocks can notably be measured. The electrical resistivity of rocks is, in most cases, of electrolytic type (i.e. the rocks conduct electric current through the fluid they contain). The electrical resistivity of a rock essentially depends on the quality of the electrolyte (i.e. on the resistivity Rw of the imbibition fluid and, therefore, on the dissolved salts amount), on the amount of electrolyte contained in the unit volume of the rock (i.e. on the porosity of the geologic layer), and on the electrolyte distribution type (i.e. we never have Sw=1, but Sw<1, hence a heterogeneous distribution that may increase over time with development and production). The resistivity of an electrolyte depends on the ion content thereof and on the ion mobility in solution. Now, mobility being variable, the resistivity of a water depends not only on the amount of dissolved salts, but also on the nature thereof. To characterize a water, the notion of equivalent salinity is often used (i.e. the NaCl salinity that would result in a resistivity equal to the measured one). Thus, the contribution of a salt to the resistivity of a solution depends on the concentration of this salt and on the total salinity. If the salinity of a water and its composition are known, it is possible to obtain, by means of a pre-established graph (for example Graph 2 presented on page 19 of document (Chapelier, 2009)), the coefficients allowing to switch from various salts to the NaCl equivalent. Unfortunately, it is impossible to know the chemical composition of a water from the resistivity thereof. It is however possible, from a pre-established graph (for example Graph 1 presented on page 17 of document (Chapelier, 2009)), to determine the salinity of a solution in NaCl equivalent from the resistivity value. The resistivity of an electrolyte also depends on the temperature thereof. A temperature increase decreases the resistivity. A graph such as Graph 1 presented on page 17 of document (Chapelier, 2009) allows to obtain the resistivity of a solution for a given temperature and NaCl salinity.

However, in-situ salinity estimation via electric logs is based on the absolute measurement of the resistivity within the formation studied. It is therefore necessary to calibrate the resistivity measuring devices so as to avoid any bias, and also to calibrate these devices according to the type of electrolyte, the quality thereof, etc. Furthermore, these logging operations can only be carried out in an uncased well (so as to avoid the presence of metal). Besides, this type of measurement allows the salinity to be estimated with a very good vertical resolution (logging tool measurement interval of the order of 1 cm), but it suffers from a low lateral resolution (low penetration depth, hence only local salinity estimation, in a limited perimeter around the well). Besides, the operations of injection of various fluids and well tests have a strong impact on the zone close to the well and therefore generate a strong uncertainty about the salinity determination. Furthermore, generally this type of measurement is costly and requires specialized technical teams.

Thus, in general terms, in-situ salinity estimations raise questions about production allocation, sampling representativity, as well as preservation of salinity under reservoir conditions, not to mention the risk of contamination of the compartments overlying the reservoir upon sample retrieval.

The present invention relates to a method of exploiting and/or of monitoring the exploitation of a fluid (such as a hydrocarbons) present in an underground formation, comprising a step of determining the salinity evolution in the formation, from pressure and spontaneous potential variation measurements repeated over time, these measurements being performed during a water injection process (secondary oil recovery) or an EOR process (tertiary recovery), and whatever the process implemented (primary, secondary or tertiary recovery).

Furthermore, the method according to the invention can enable in-situ monitoring of the (absolute and relative) permeability evolution in the formation. All of this information can be incorporated into a model representative of the underground formation (also referred to as reservoir model), intended for example for reservoir simulation, so as to enable real-time management of the exploitation of the hydrocarbons in the formation.

SUMMARY OF THE INVENTION

The invention relates, in general, to a method of exploiting and/or of monitoring the exploitation of a fluid such as a hydrocarbon fluid present in at least one geologic layer of an underground formation, at least one well being drilled through at least said layer of said formation. By means of at least one graph representative of the evolution of the electrokinetic coupling coefficient as a function of salinity for said layer, the salinity within at least said layer is determined at least at one measurement point located in said well and at the level of said layer for at least one predefined time Ti of the exploitation of said fluid, by carrying out at least the following steps:

a) measuring a pressure at said measurement point for at least said time Ti, a time Ti−1 preceding said time Ti and a time Ti+1 following said time Ti, b) measuring a spontaneous potential at said measurement point for said times Ti−1, Ti and Ti+1, c) from said pressure measurements and said spontaneous potential measurements for said times Ti−1, Ti and Ti+1 at said measurement point, determining the slope of a curve showing the evolution of the spontaneous potential gradient as a function of the pressure gradient between said times Ti−1 and Ti+1, and d) from said slope and said graph, determining a value for said salinity at said measurement point and at said time Ti.

Said fluid is then exploited and/or said exploitation of said fluid is then monitored by taking account of said value of said salinity.

According to an implementation of the invention, said graph can be determined beforehand by performing, in the laboratory and using a rock sample representative of said geologic layer, pressure and spontaneous potential measurements for a plurality of salinity values of a brine saturating said sample.

According to a variant embodiment of the invention, said well can be a production well, an injection well or a well intended for monitoring said exploitation of said fluid.

According to an implementation of the invention, said pressure measurements and said spontaneous potential measurements can be taken at least at two measurement points in at least two wells drilled through at least said layer of said formation, and an evolution of said salinity can be determined in said layer between said two wells.

According to a variant embodiment of the invention, in addition to said value of said salinity, an absolute permeability value can be determined for said layer by performing, in addition to said pressure measurements and said spontaneous potential measurements, measurements of the flow rate of said exploited fluid at least at said measurement point and for at least said times Ti, Ti−1 and Ti+1.

According to an implementation of the invention, in addition to said value of said salinity, a relative permeability value can be determined at said measurement point by performing, in addition to said pressure measurements and said spontaneous potential measurements, electrical resistivity measurements at least at said measurement point and for at least said times Ti, Ti−1 and Ti+1.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
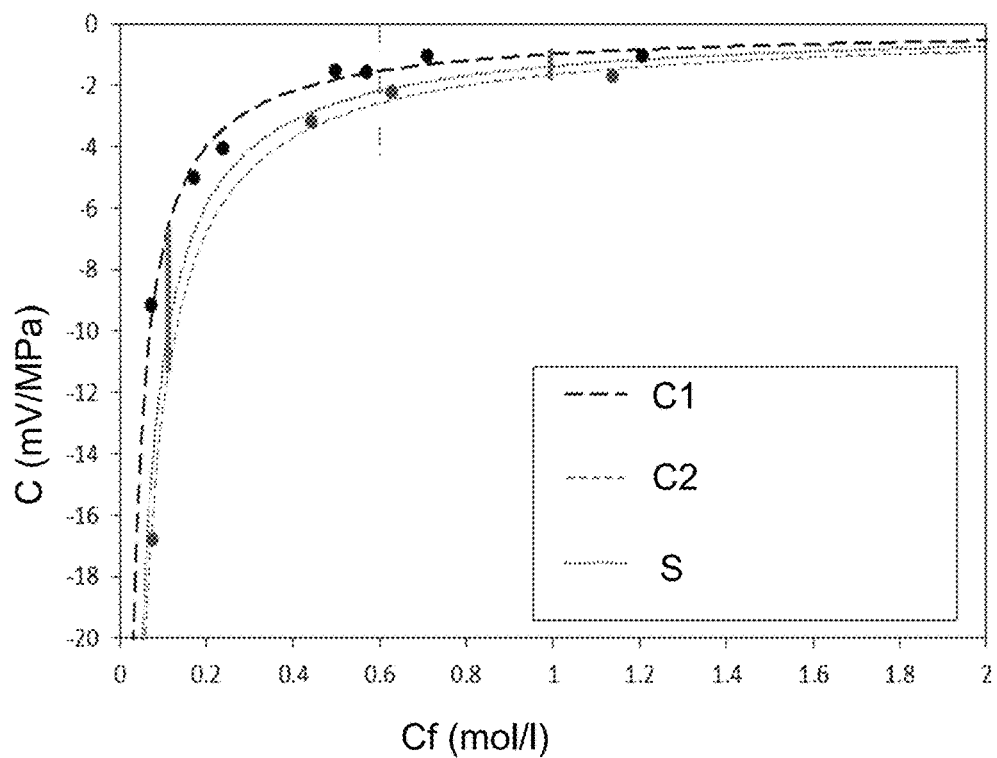
FIG. 1 shows a graph representing the evolution of the electrokinetic coupling coefficient (C) as a function of salinity (Cf) for various rock types.

In general, one object of the invention relates to a method of exploiting and/or of monitoring the exploitation of a fluid (such as a hydrocarbon fluid) present in at least one geologic layer of an underground formation, at least one well being drilled through the geologic layer of interest. More particularly, the invention is aimed at estimating a value for the salinity in at least one geologic layer of the formation, for at least a time Ti during the exploitation of this fluid. In the rest of the description hereafter, we consider that the fluid exploited is a hydrocarbon fluid (referred to as hydrocarbons in general terms hereafter), but the invention can also be implemented for the exploitation of any other type of fluid (water for example).

According to an embodiment of the invention where hydrocarbons are exploited by means of an enhanced recovery technique, the well drilled through the geologic layer of interest can be an injection well (in case, for example, of hydrocarbon exploitation through secondary or tertiary recovery), a production well or a well intended for hydrocarbon exploitation monitoring. This or these well(s) have been previously drilled, by means of drill bits, so as to run through at least the layer of the underground formation containing the hydrocarbons to be exploited. This or these well(s) can have any geometry.

The method according to the invention requires the existence of at least one graph (a curve for example) representative of the evolution of the electrokinetic coupling coefficient as a function of salinity for the geologic layer of interest. There are many such graphs in the literature, established for different rock types. An example of such a graph, for various sandstone types (classified according to their permeability, porosity), is given for instance in the document (Vinogradov et al., 2010). The following documents can also be consulted: Glover et al., 2012; Jaafar et al., 2009; Esmaeili et al., 2016; Jaafar and Pourbasirat, 2011.

Advantageously, in order to estimate as precisely as possible the salinity within the geologic layer of interest, such a graph can be created prior to said estimation, from at least one rock sample taken in the layer of interest (see optional step 3.3 described below). The graph considered for implementing the method according to the invention is thus perfectly representative of the evolution of the electrokinetic coupling coefficient as a function of salinity for the layer considered, since it has been generated directly from a sample of the layer of interest.

The method according to the invention then comprises at least the following steps:

1. Pressure measurements
2. Spontaneous potential measurements
3. Salinity estimation
4. Hydrocarbon exploitation and/or exploitation monitoring The various steps of the invention are described hereafter. Steps 1 and 2 can be carried out in this order, simultaneously or in the opposite order.

1. Pressure Measurements

This step consists in measuring the pressure at least at one measurement point located in at least one of the wells drilled through the geologic layer of interest of the underground formation, for at least three times of the exploitation of said hydrocarbons: time Ti of interest, a time Ti−1 preceding said time Ti and a time Ti+1 following time Ti. Thus, according to the invention, at least three pressure measurements are performed at the same measurement point but at three different times. Preferably, a plurality of measurements is carried out, for predetermined times $T_1$ to $T_N$, with N≥3, selected in the period of exploiting the hydrocarbons of at least the geologic layer of interest. These measurement times can be selected so as to be regularly spaced out over the hydrocarbon exploitation time, which allows to have a continuous estimation of the salinity in the geologic layer of interest. Alternatively, sampling of these measurement times may not be regular; it can for example be selected so as to estimate the salinity in the geologic layer of interest at key moments in the hydrocarbon exploitation of the geologic layer considered.

According to the invention, these measurements are taken with a pressure measuring device such as, for example, a PAA-33X type pressure sensor marketed by the Keller company. The pressure sensor may for example have been installed prior to implementing the method according to the invention, for example upon drilling of the well where the measurements are performed. These pressure sensors can be installed on the drilling device in case of mud logging, preferably inside the well in case of wireline logging, which would enable to monitor the evolution of a pressure differential on a vertical profile at the level of the reservoir considered. In case of pressure monitoring over the extent of a reservoir (and not on a vertical profile), it is necessary to have at least two wells and one sensor inside each one. According to a preferred embodiment of the invention, the pressure sensor(s) can be permanently installed, using the pocket side technique well known to specialists.

According to an implementation of the invention, a plurality of pressure sensors is installed in one well. A plurality of pressure sensors can for example be arranged at different measurement points of the geologic layer of interest (i.e. the main hydrocarbon reservoir) and a plurality of pressure sensors can additionally be arranged at different measurement points of any other geologic layer of the underground formation studied and traversed by the well considered (such as a secondary hydrocarbon reservoir, or an aquifer whose salinity evolution is to be monitored). For each measurement point, i.e. for each position (x,y,z) in a well, at least three pressure values are measured for times Ti−1, Ti and Ti+1. The evolution of the salinity can thus be monitored at several measurement points in a single geologic layer (which is advantageous in case of a thick hydrocarbon reservoir), or the evolution of the salinity can be monitored for several geologic layers (for the main reservoir and for secondary reservoirs, and/or for the main reservoir and for an underlying aquifer).

Advantageously, this type of measurement is performed for various wells drilled through at least the geologic layer of interest, such as a production well, an injection well and/or a well intended for hydrocarbon exploitation monitoring. The measurements performed in different wells can allow to monitor the evolution of the salinity in various lateral positions of the underground formation, and thus to understand the motions of the fluids in the formation, which can contribute to an efficient management of the underground formation development.

2. Spontaneous Potential Measurements

This step consists in measuring the spontaneous potential at least at one measurement point located in at least one of the wells drilled through the geologic layer of interest in the underground formation, for at least three times of the exploitation of said hydrocarbons: time Ti of interest, a time Ti−1 preceding said time Ti and a time Ti+1 following time Ti. The spontaneous potential is a measurement of the electrical potential difference naturally occurring in an underground formation. It notably allows to characterize fluid circulations in a formation. Thus, according to the invention, at least three spontaneous potential measurements, taken at the same measurement point but for three different times, are necessary for implementing the invention. Preferably, a plurality of measurements is performed, for predetermined times $T_1$ to $T_N$, with N≥3, selected in the period of exploiting the hydrocarbons of at least the geologic layer of interest. These measurement times can be selected so as to be regularly spaced out over the hydrocarbon exploitation time, which allows to have a continuous estimation of the salinity in the geologic layer of interest. Alternatively, sampling of these measurement times may not be regular; it can for example be selected so as to estimate the salinity in the geologic layer of interest at key moments in the hydrocarbon exploitation of the geologic layer considered.

According to the invention, these measurements are taken with a spontaneous potential measuring device. Such a spontaneous potential measuring device can comprise at least two non-polarizable electrodes connected to a resistivity meter such as, for example, a TERRAMETER SAS4000 type resistivity meter marketed by the ABEM Company. The non-polarizable electrodes may for example have been installed prior to implementing the method according to the invention, for example upon drilling of the well where the measurements are performed. According to an embodiment of the invention, the at least two electrodes required for measuring a spontaneous potential difference are arranged along a single well, for example at the top and at the base of the reservoir bed, so as to monitor the potential evolution caused by the vertical fluid flows. According to another variant embodiment of the invention, the at least two electrodes are arranged in two distinct wells, so as to measure the lateral evolution of the spontaneous potential. The resistivity meter is for example arranged at the surface of the formation and it is connected to the electrodes by electric cables protected by a fluid-tight sheath in order to avoid any detrimental corrosion when the spontaneous potential measuring device is left on site for a long time (several years, for example, in case of site monitoring).

According to an implementation of the invention, a plurality of electrode pairs is installed in a single well. A plurality of electrode pairs can for example be installed at different measurement points of the geologic layer of interest and a plurality of electrode pairs can further be installed at different measurement points of any other geologic layer (such as a secondary hydrocarbon reservoir, or an aquifer whose salinity evolution is to be monitored) of the underground formation studied and traversed by the well. For each measurement point, i.e. for each position (x,y,z) in a well, at least three spontaneous potential values are measured for times Ti−1, Ti and Ti+1. The evolution of the salinity can thus be monitored at several measurement points in a single geologic layer (which is advantageous in case of a thick hydrocarbon reservoir), or the evolution of the salinity can be monitored for several geologic layers (for the main reservoir and for secondary reservoirs, and/or for the main reservoir and for an underlying aquifer).

Advantageously, this type of measurement is performed for various wells drilled through at least the geologic layer of interest, such as a production well, an injection well and/or a well intended for hydrocarbon exploitation monitoring. The measurements taken in different wells can allow to monitor the evolution of the salinity in various lateral positions of the underground formation, and thus to understand the motions of the fluids in the formation, which can contribute to an efficient management of the underground formation development.

3. Salinity Estimation

This step consists in determining, from the pressure measurements and the spontaneous potential measurements taken for times Ti−1, Ti and Ti+1 and at least at one measurement point located in the geologic layer of interest, the slope of a curve showing the evolution of the spontaneous potential gradient as a function of the pressure gradient between times Ti−1 and Ti+1 for the measurement point considered (see substep 3.1 below). This slope corresponding to the electrokinetic coupling coefficient, a value representative of the salinity is determined from a graph representative of the evolution of the electrokinetic coupling coefficient as a function of salinity for this measurement point located in the geologic layer of interest and from this slope (see substep 3.2 below). According to an implementation of the method of the invention, such a graph is previously determined (see optional substep 3.3 below). According to another implementation of the invention, in addition to the salinity, the absolute permeability and/or the relative permeability associated with the geologic layer of interest are also determined (see optional substep 3.4 below).

3.1 Determination of the Electrokinetic Coupling Coefficient

This substep consists in determining, from the pressure measurements and the spontaneous potential measurements taken as described above for at least times Ti−1, Ti and Ti+1, at least one electrokinetic coupling coefficient value, for at least time Ti. Therefore, according to the invention, the slope at time Ti of the curve representing the evolution of the pressure gradient as a function of the spontaneous potential gradient at least around the time Ti considered is determined.

According to an implementation of the invention, two values are therefore estimated for the pressure gradient, from the at least three pressure measurements performed at times Ti−1, Ti and Ti+1. Similarly, two values are estimated for the spontaneous potential gradient, from the at least three spontaneous potential measurements performed at times Ti−1, Ti and Ti+1. The slope at the time Ti considered of the curve representing the evolution of the spontaneous potential gradient as a function of the gradient around time Ti is then estimated. This slope corresponds to the electrokinetic coupling coefficient at the time Ti considered. It is clear that this example of implementation of the local slope estimation, around the time Ti considered, is not limitative and that this slope could have been estimated by considering more than three pressure and/or spontaneous potential measurement points, and/or that the estimation of the pressure gradient and/or of the spontaneous potential gradient could have been made from more than two measurement points, and/or that the slope itself of the curve representative of the variation of the spontaneous potential gradient as a function of the pressure gradient could also have been estimated from more than two pressure and/or spontaneous potential gradient values.

Advantageously, the estimation of the electrokinetic coupling coefficient is repeated for each time Ti such that i>1, i<N and N≥3, for which a pressure measurement and a spontaneous potential measurement have been taken. A value is thus obtained for the electrokinetic coupling coefficient for each time Ti such that i>1, i<N and N≥3 sampled during exploitation of the hydrocarbons of the underground formation studied.

Besides, this estimation of the electrokinetic coupling coefficient for at least one time Ti of the exploitation of the hydrocarbons contained in a geologic layer of an underground formation can be repeated for any other geologic layer of interest (such as a secondary hydrocarbon reservoir, or an aquifer whose salinity evolution is to be monitored) of the underground formation studied and traversed by the well considered. For each measurement point, i.e. for each position (x,y,z) in the well considered, at least one electrokinetic coupling coefficient value is estimated for at least one given time Ti.

Advantageously, estimation of the electrokinetic coupling coefficient is performed for various wells drilled through at least the geologic layer of interest, such as a production well, an injection well and/or a well intended for hydrocarbon exploitation monitoring. This estimation conducted in different wells can allow to monitor the salinity evolution in various lateral positions of the underground formation, and thus to understand the fluid motions in the formation, which can contribute to an efficient management of the underground formation development.

3.2 Salinity Determination

This substep consists in determining a value representative of the salinity for at least time Ti for at least the geologic layer of interest and for at least the well considered, from the electrokinetic coupling coefficient as determined in substep 3.1 and from a graph representative of the evolution of the electrokinetic coupling coefficient as a function of salinity for at least the constituent rock of the geologic layer of interest in the well considered.

According to an implementation of the invention, when such a graph does not exist or when a graph perfectly representative of the constituent rock of the geologic layer of interest at the measurement point considered (notably representative of the constituent rock of the geologic layer in the well considered, but more generally at position (x,y,z) of the measurement point considered) is required, such a graph is previously constructed (see substep 3.3 below).

An example of such a graph is shown in FIG. 1 in the case of three different rock types: a Brauvilliers limestone of permeability 2 mD (denoted by C1), a Brauvilliers limestone of permeability 300 mD (denoted by C2) and sandstones of different permeabilities (25 mD, 38 mD, 70 mD, 3 D) (denoted by S). It is observed that the electrokinetic coupling coefficient (C) varies as a function of salinity Cf along a curve depending on the type of rock considered.

Thus, from such a graph, from the rock type and from the value of the electrokinetic coupling coefficient for a time Ti taken during the exploitation of hydrocarbons in a given geologic layer, the salinity in the layer considered for the time Ti considered and at the measurement point considered can be determined.

This estimation can be advantageously repeated at each point where the pressure and the spontaneous potential are measured according to the method of the invention, along a single well and/or in different wells, for a s single geologic layer and/or for any other geologic layer of interest (such as a secondary hydrocarbon reservoir, or an aquifer whose salinity evolution is to be monitored) of the underground formation studied. According to an implementation of the invention, ad hoc graphs are used and/or constructed (see substep 3.3 below) depending on the type of rock encountered at each measurement point considered.

3.3 Determination of a Graph Showing the Evolution of the Electrokinetic Coupling Coefficient as a Function of Salinity This substep is optional. It consists in making a graph representative of the evolution of the electrokinetic coupling coefficient as a function of salinity, from a rock sample representative of the constituent rock of the geologic layer(s) of interest. Advantageously, the rock sample used for carrying out this step was taken in situ, at the measurement point where the salinity is to be estimated (therefore at the measurement point where spontaneous potential and pressure measurements were taken for at least the 3 times Ti−1, Ti and Ti+1), so that the graph constructed from this sample is as representative as possible of the underlying physical reality.

Figure 2:
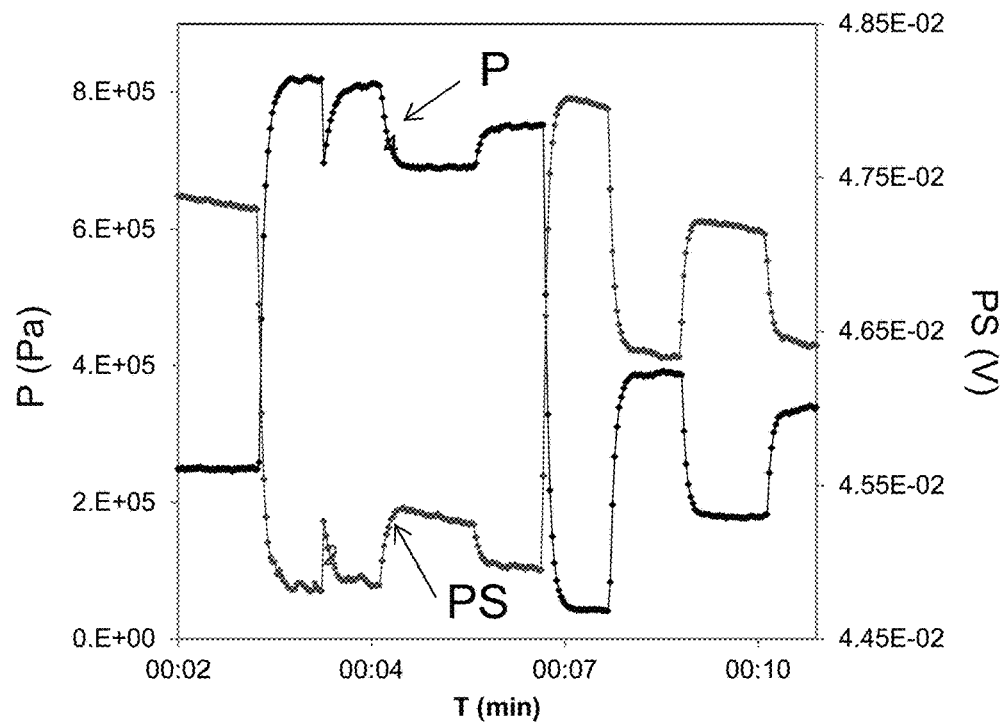
FIG. 2 shows the evolution of the pressure and of the spontaneous potential for a succession of flow rate values for a brine of given salinity injected into a rock sample.

In general, setting up this graph consists in saturating a rock sample representative of the measurement point of interest with a brine of known salinity, then in varying the flow rate of this brine in the sample and in measuring the resulting pressure difference and spontaneous potential difference (for example between the two faces of the sample considered). FIG. 2 shows the results of a series of pressure and spontaneous potential measurements for a succession of flow rate values for a brine of salinity 10 g/L injected into a Brauvilliers limestone sample. It can be observed in this figure that 9 measuring stages were carried out, with irregular flow rate increase and decrease cycles. All these stages match and give the same value for ΔV/ΔP, which shows that the measurement protocol established is reliable.

Figure 3:
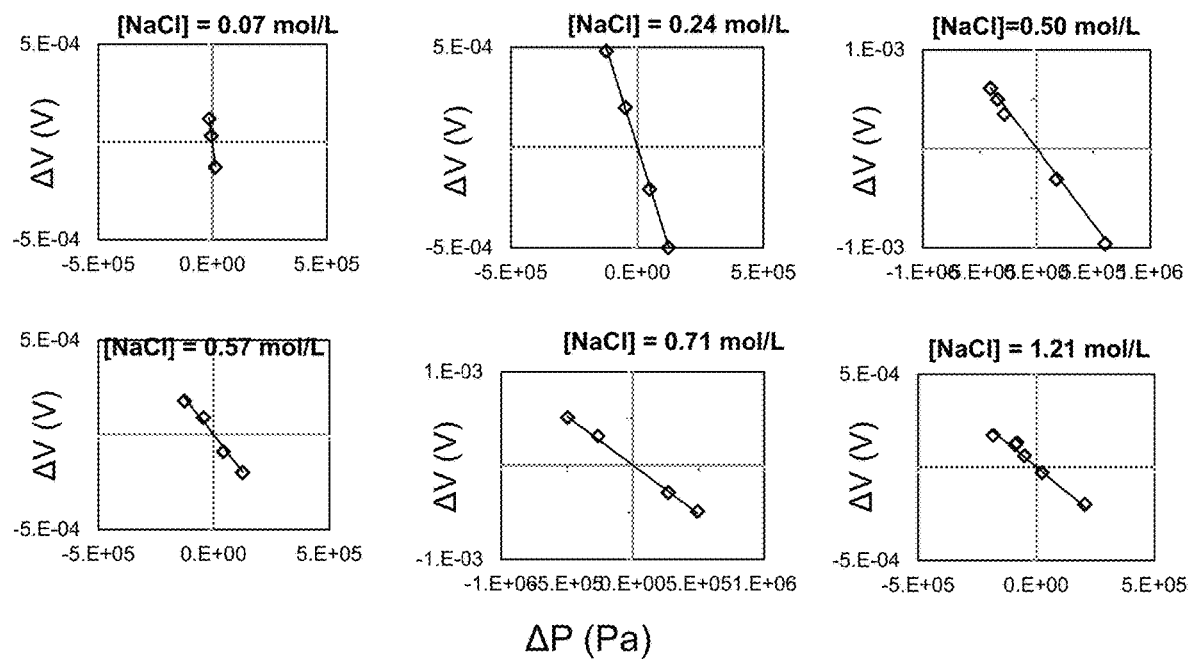
FIG. 3 shows a series of curves representing the evolution of the spontaneous potential gradient as a function of the pressure gradient, each curve corresponding to a given salinity.
Figure 4:
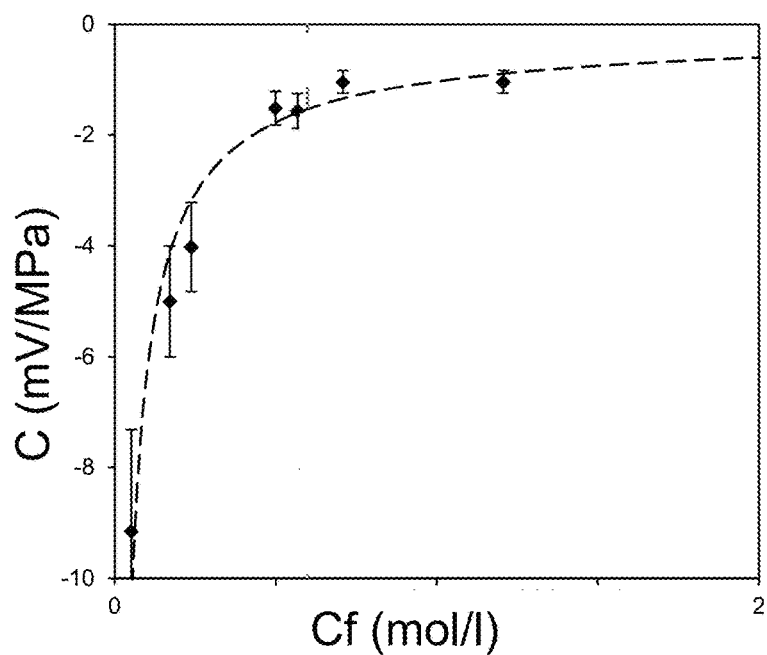
FIG. 4 shows a graph representing the evolution of electrokinetic coupling coefficient C as a function of salinity Cf for a rock sample.

FIG. 3 shows a series of 6 curves representing the evolution of the spontaneous potential gradient as a function of the pressure gradient, each curve corresponding to a given salinity (from left to right and top to bottom respectively: [NaCl]=0.07 mol/l, [NaCl]=0.24 mol/l, [NaCl]=0.50 mol/l, [NaCl]=0.57 mol/l, [NaCl]=0.71 mol/l and [NaCl]=1.21 mol/l). The slope of each curve, i.e. electrokinetic coupling coefficient C, is then estimated and transferred to a diagram, as shown in FIG. 4, representing the evolution of electrokinetic coupling coefficient C as a function of salinity Cf.

This optional substep can be advantageously repeated for any rock sample representative of a measurement point for which a salinity measurement is required.

3.4 Determination of the Absolute and Relative Permeability

This optional substep consists in estimating, in addition to salinity, the absolute permeability and/or the relative permeability for at least the time Ti considered, for at least the geologic layer of interest and for at least the measurement point considered.

According to an implementation of the invention, the absolute permeability is determined at the measurement point considered as follows: in addition to the spontaneous potential measurements and to the pressure measurements described in the above sections 1 and 2 respectively, flow rate measurements of the exploited fluid are performed (flow rate measurements taken at the top of an injection well and/or of a production well for example), at least at the measurement point and for at least the times Ti−1, Ti and Ti+1 for which spontaneous potential measurements and pressure measurements are also available. The absolute permeability k is then determined from Darcy's law, with the formula as follows:

$$k = \frac{Q}{S} \cdot \frac{\Delta x}{\Delta P} \cdot \eta$$

where Q is the flow rate thus measured, S is the flow section area, Δx is the distance over which the flow occurs, ΔP is the pressure gradient thus measured, and η is the fluid viscosity. Advantageously, the absolute permeability is determined in the case of pressure and flow rate measurements performed between two wells. An average absolute permeability is thus determined between the two wells considered.

According to another implementation of the invention that can be combined with the previous one (advantageously in the case of enhanced recovery using a sweep fluid corresponding to a gas), the relative permeability is determined at the measurement point considered as follows: from pressure measurements as described in section 1 and spontaneous potential measurements as described in section 2, a value is estimated for an electrokinetic coupling coefficient in an unsaturated medium $C_{SW<1}$ (i.e. a coupling coefficient value determined at a given time Ti, for a given brine saturation). Furthermore, from a rock sample taken in the geologic layer of interest (ideally, the sample was taken at the measurement point of interest), a laboratory experiment is conducted in order to measure the electrokinetic coupling coefficient for a total brine saturation $C_{SW=1}$. A relative electrokinetic coupling coefficient $C_r = C_{SW<1}/C_{SW=1}$ is then defined, where Sw is the brine saturation, $C_{SW<1}$ is the electrokinetic coupling coefficient for a brine saturation below 1, and $C_{SW=1}$ is the electrokinetic coupling coefficient for a total brine saturation. Besides, in addition to the pressure and spontaneous potential measurements respectively described in sections 1 and 2 above, electrical resistivity measurements are performed at least at the measurement point considered, and for at least the times Ti, Ti−1 and Ti+1 for which spontaneous potential measurements and pressure measurements are also available. These electrical resistivity measurements can be taken by means of the electrodes and the resistivity meter used for measuring the spontaneous potential difference (see step 2 described above). A resistivity index $$I_R = \frac{R_t}{R_o}$$

is then determined, where $R_t$ and $R_0$ are the real part of the resistivity in an unsaturated medium and in a saturated medium respectively. The fluid saturation $S_w$ is further determined at the measurement point considered, for example by means of electrical resistivity logs known to specialists. The saturation exponent n of Archie's law is then deduced from fluid saturation $S_w$, knowing in addition that the resistivity index can also be written as follows: $I_R = S_w^{-n}$. The relative permeability can then be obtained with a formula of the type:

$$K_r = C_r \cdot S_w^{n+1}$$

where $C_r = C_{SW<1}/C_{SW=1}$ is the relative electrokinetic coupling coefficient, $S_w$ is the brine saturation, $C_{SW<1}$ is the electrokinetic coupling coefficient for a brine saturation below 1 and $C_{SW=1}$ is the electrokinetic coupling coefficient for a total brine saturation.

The absolute and/or relative permeability values thus obtained can be incorporated into a model representative of the underground formation (also referred to as reservoir model), intended for example for reservoir simulation, so as to enable real-time management of the exploitation of the hydrocarbons in the formation. Reservoir simulation is a technique allowing to simulate fluid flows by means of a software referred to as flow simulator and of a gridded representation of the formation studied, or reservoir model. The result of a reservoir simulation is in particular a succession of snapshots (such as pictures taken at different times) representative of the fluid flow state in the formation studied. These snapshots allow for example to determine a location for new injection and/or production wells to be drilled, enabling to maximize hydrocarbon production while maintaining a sufficient pressure in the reservoir to facilitate long-term recovery thereof. For example, the Puma Flow® software (IFP Energies nouvelles, France) is a reservoir simulator.

4. Hydrocarbon Exploitation and/or Exploitation Monitoring

This stage consists in managing the exploitation of the hydrocarbons present in at least the geologic layer of interest by taking account of the salinity estimation performed as described in steps 1 to 3 above.

Since salinity plays an important role in the affinity of the porous medium with the oil in place, this estimation of salinity evolution within a hydrocarbon reservoir under development notably allows to anticipate "fluid-rock" interaction mechanisms that occur in a hydrocarbon reservoir during development, and therefore enables better EOR process management. In particular, data relative to the salinity evolution in a geologic layer provide information relative to the course of the enhanced oil recovery process. Indeed, monitoring the salinity evolution in a reservoir allows to infer if mixing has occurred between the injected sweep fluid and the fluid initially in place, or if sweeping itself is efficient, or if sweep sequencing is efficient, for example in the case of a SWAG (Sweep Water Alternative Gas) type enhanced recovery method. Furthermore, knowing the salinity of the medium over time provides information as to whether salt was or was not deposited by precipitation in the pores of the enclosing rock, and therefore enables to infer if the enhanced recovery process has or has not had an impact on the petrophysical properties of the reservoir (porosity and permeability notably). Thus, the method according to the invention is particularly advantageous within the context of primary recovery by water injection, this type of recovery generating significant salinity changes over time.

The method according to the invention can also be particularly advantageous within the context of heat carrier fluid injection and recovery for medium-depth and great-depth geothermal energy systems. Indeed, in this case, heat modifications and exchanges between recovered fluid and injected fluid may occur, generating a geochemical imbalance and a possible precipitation of species (such as salts), hence changes in the petrophysical properties of the reservoir to be developed.

Furthermore, salinity monitoring in geologic layers other than the one corresponding to the main reservoir (such as, for example, an aquifer overlying the main and/or secondary reservoir) allows to detect possible detrimental injected fluid leakage (fluids containing polymers, surfactants for example). Thus, the method according to the invention can be particularly advantageous for potable water aquifers.

Advantageously, spontaneous potential and pressure measurements, as well as salinity estimations, are carried out throughout the exploitation of hydrocarbons for the formation concerned, so as to have a curve representative of the salinity evolution within at least the geologic layer of interest, throughout the exploitation of these hydrocarbons. Measurements can be taken regularly during hydrocarbon exploitation, which allows to have a continuous salinity estimation for the geologic layer of interest over time. Sampling these measurement times may alternatively be non periodic, for example selected so as to estimate the salinity within the geologic layer of interest at key moments of the hydrocarbon exploitation in the geologic layer considered.

Advantageously, estimation of the electrokinetic coupling coefficient is performed for at least two wells drilled through at least the geologic layer of interest. Each one of the two wells can be selected from among a production well, an injection well or a well intended for hydrocarbon exploitation monitoring. This estimation carried out in different wells can allow to monitor the salinity evolution in various lateral positions of the underground formation, and thus to understand the motions of the fluids in the formation, which can contribute to an efficient management of the underground formation development. The method according to the invention can for example enable to modify, during hydrocarbon exploitation, the salinity of the brine injected within the context of enhanced recovery, to modify the flow rate of the sweep fluid injected into the formation, to drill new injection and/or production wells so as to modify fluid flow pathways unfavourable for optimum exploitation, etc.

Thus, the method according to the invention allows to estimate the salinity present in an underground formation, from pressure and spontaneous potential variation measurements. Therefore, the method of the invention is not based on absolute measurements, but only on relative measurements, which allows to avoid measuring device bias and calibration problems. Furthermore, these measurements, when repeated over time, for example during a water injection process (secondary oil recovery) or an EOR process (tertiary recovery), allow monitoring of the salinity evolution throughout an oil recovery process, and therefore real-time management of this recovery process.

Besides, the method according to the invention can allow to determine the evolution of the (absolute and relative) permeability in the formation. All these data can be incorporated into a model representative of the underground formation (also referred to as reservoir model), intended for example for reservoir simulation, so as to enable real-time management of the exploitation of the hydrocarbons in the formation.

The invention claimed is:

1. A method of exploiting and/or of monitoring the exploitation of a fluid present in at least one geologic layer of an underground formation, at least one well being drilled through the at least one geologic layer of the underground formation, by means of at least one graph representative of the evolution of the electrokinetic coupling coefficient as a function of salinity for the at least one geologic layer of the underground formation, wherein the salinity within the at least one geologic layer of the underground formation is determined at least at one measurement point located in the at least one well and at the level of the at least one geologic layer of the underground formation for at least one predefined time Ti of the exploitation of the fluid, by carrying out at least the following steps:

a) measuring a pressure at the measurement point for the at least one predefined time Ti, a time Ti-1 preceding the at least one predefined time Ti and a time Ti+1 following the at least one predefined time Ti, b) measuring a spontaneous potential at the measurement point for Ti-1, Ti and Ti+1, c) from the pressure measurements and the spontaneous potential measurements for Ti-1, Ti, and Ti+1 at the measurement point, determining the slope of a curve showing the evolution of the spontaneous potential gradient as a function of the pressure gradient between Ti-1 and Ti+1, and d) from the slope and the at least one graph, determining a value for the salinity at the measurement point and at Ti, and in that the fluid is exploited and/or the exploitation of the fluid is monitored by taking account of the value of the salinity.

2. The method as claimed in claim 1, wherein the fluid comprises a hydrocarbon fluid.

3. The method as claimed in claim 1, wherein the at least one graph is determined beforehand by performing, in the laboratory and using a rock sample representative of the at least one geologic layer of the underground formation, pressure and spontaneous potential measurements for a plurality of salinity values of a brine saturating the sample.

4. The method as claimed in claim 1, wherein the at least one well includes one or more of a production well, an injection well, and a well intended for monitoring the exploitation of the fluid.

5. The method as claimed in claim 1, wherein the pressure measurements and the spontaneous potential measurements are taken at least at two measurement points in at least two wells drilled through the at least one geologic layer of the underground formation, and an evolution of the salinity is determined in the at least one geologic layer of the underground formation between the at least two wells.

6. The method as claimed in claim 1 wherein, in addition to the value of the salinity, an absolute permeability value is determined for the at least one geologic layer of the underground formation by performing, in addition to the pressure measurements and the spontaneous potential measurements, measurements of a flow rate of the exploited fluid at least at the measurement point and for at least Ti, Ti−1, and Ti+1.

7. The method as claimed in claim 1 wherein, in addition to the value of the salinity, a relative permeability value is determined at the measurement point by performing, in addition to the pressure measurements and the spontaneous potential measurements, electrical resistivity measurements at least at the measurement point and for at least Ti, Ti−1, and Ti+1.

* * * * *